(12) United States Patent
Harada et al.

(10) Patent No.: US 11,898,797 B2
(45) Date of Patent: *Feb. 13, 2024

(54) ELECTRIC FURNACE

(71) Applicant: NIPPON STEEL CORPORATION, Tokyo (JP)

(72) Inventors: Toshiya Harada, Tokyo (JP); Takashi Arai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 1005 days.

This patent is subject to a terminal disclaimer.

(21) Appl. No.: 16/468,615

(22) PCT Filed: Nov. 10, 2017

(86) PCT No.: PCT/JP2017/040600
§ 371 (c)(1),
(2) Date: Jun. 11, 2019

(87) PCT Pub. No.: WO2018/110174
PCT Pub. Date: Jun. 21, 2018

(65) Prior Publication Data
US 2020/0080780 A1    Mar. 12, 2020

(30) Foreign Application Priority Data

Dec. 16, 2016 (JP) ................. 2016-244501

(51) Int. Cl.
*F27B 3/10* (2006.01)
*F27B 3/08* (2006.01)
(Continued)

(52) U.S. Cl.
CPC ............... *F27B 3/105* (2013.01); *F27B 3/04* (2013.01); *F27B 3/06* (2013.01); *F27B 3/065* (2013.01);
(Continued)

(58) Field of Classification Search
None
See application file for complete search history.

(56) References Cited

U.S. PATENT DOCUMENTS 5,715,272 A    2/1998  Kaell et al.
2003/0140732 A1  7/2003  Edlinger
(Continued)

FOREIGN PATENT DOCUMENTS

CN    103930574 A    4/2011
CN    103930574 A    7/2014
(Continued)

OTHER PUBLICATIONS

Extended European Search Report, dated Apr. 9, 2020, for European Application No. 17880427.4.
(Continued)

*Primary Examiner* — Scott R Kastler
(74) *Attorney, Agent, or Firm* — Birch, Stewart, Kolasch & Birch, LLP

(57) ABSTRACT

The present invention provides an electric furnace including: a furnace body that includes an electrode; and a slag holding furnace that is configured to hold molten slag in a molten state and is capable of pouring the molten slag into the furnace body when tilted, in which the furnace body includes a cylindrical furnace wall, a furnace cover that is provided at an upper end of the furnace wall, a furnace bottom that is provided at a lower end of the furnace wall and includes a deep bottom portion and a shallow bottom portion as a region having a height of 150 mm to 500 mm from a deepest point of the deep bottom portion, and a slag pouring port that is provided at the furnace cover and through which the molten slag is poured from the slag holding furnace, the slag pouring port overlaps the shallow bottom portion in a plan view, and the area ratio of the (Continued)

shallow bottom portion to the furnace bottom in a plan view is 5% to 40%.

1 Claim, 10 Drawing Sheets

(51) Int. Cl.
    *F27B 3/04*     (2006.01)
    *F27B 3/06*     (2006.01)
    *F27B 3/18*     (2006.01)
    *F27B 3/12*     (2006.01)

(52) U.S. Cl.
    CPC ............... *F27B 3/08* (2013.01); *F27B 3/085* (2013.01); *F27B 3/186* (2013.01); *F27B 2003/125* (2013.01)

(56) References Cited

U.S. PATENT DOCUMENTS

| | | | |
|---|---|---|---|
| 2014/0247856 A1 | 9/2014 | Harada et al. | |
| 2015/0135896 A1 | 5/2015 | Harada et al. | |
| 2020/0064071 A1* | 2/2020 | Harada | ................ F27D 3/0031 |
| 2020/0080780 A1* | 3/2020 | Harada | ................... F27B 3/186 |

FOREIGN PATENT DOCUMENTS

| | | | |
|---|---|---|---|
| EP | 0462713 | A1 | 12/1991 |
| FR | 1598035 | A | 6/1970 |
| JP | 52-33897 | A | 3/1977 |
| JP | 10-2538 | A | 1/1998 |
| JP | 10-175046 | A | 6/1998 |
| JP | 2002-317918 | A | 10/2002 |
| JP | 2003-520899 | A | 7/2003 |
| JP | 2005-146357 | A | 6/2005 |
| JP | 2008-75950 | A | 4/2008 |
| JP | 5522320 | B1 | 6/2014 |
| WO | WO 2014/003123 | A1 | 1/2014 |

OTHER PUBLICATIONS

International Search Report for PCT/JP2017/040600 (PCT/ISA/210) dated Jan. 30, 2018.
Written Opinion of the International Searching Authority for PCT/JP2017/040600 (PCT/ISA/237) dated Jan. 30, 2018.
Ye et al., "Reduction of steel-making slags for recovery of valuable metals and oxide materials", Scandinavian Journal of Metallurgy, 2003, vol. 32, pp. 7-14.
Chinese Office Action and Search Report dated Nov. 19, 2019, for counterpart Chinese Application No. 201780076809.4, with English translation.

* cited by examiner

ELECTRIC FURNACE

TECHNICAL FIELD OF THE INVENTION

The present invention relates to an electric furnace that is used for a process in which molten slag produced in a steelmaking step is temporarily held in a slag holding furnace while maintaining the molten state thereof and then is poured into the electric furnace and reduced.

Priority is claimed on Japanese Patent Application No. 2016-244501, filed on Dec. 16, 2016, the content of which is incorporated herein by reference.

RELATED ART

Recently, the recycling of resources has been demanded, and a method has been developed in which valuable materials such as Fe or P are separated and collected from slag (steelmaking slag) which is produced using a converter or the like through desulfurization, dephosphorization, or decarburization refinement in a steelmaking step and the steelmaking slag is reformed into high-quality slag to be reused.

For example, Patent Document 1 discloses a slag treatment method including: a first step of obtaining modified slag by adding iron and steel slag to molten iron and steel in a melting furnace, adding heat and a reducing material to modify the iron and steel slag, and causing Fe, Mn, and P in the slag to move to molten iron and steel; and second and third steps of sequentially oxidizing Mn and P in the molten iron and steel to move to modified slag and sequentially extracting high-Mn slag and high-P slag.

Patent Document 2 discloses a method including: pouring iron and steel slag containing higher than 5 wt % of iron oxide into a steel bath containing lower than 1.5 wt % of carbon; obtaining the steel bath containing higher than 2.0 wt % of carbon by introducing carbon or a carbon carrier into the steel bath to carburize the steel bath; and reducing oxides in the iron and steel slag.

In this method, during the pouring of the slag, the slag reacts vigorously with the steel bath such that the foaming of the slag (slag foaming) or the overflowing of the slag from the furnace may occur. In order to suppress slag foaming and overflowing, the carbon content in the steel bath is reduced before the pouring of the slag. As a result, the reaction rate during the pouring of the slag is alleviated, and subsequently the carbon content in the steel bath is increased to perform a reduction treatment of the slag.

Non-Patent Document 1 discloses the results of a slag reduction test in which steel slag powder, carbon powder, and slag reforming material powder are charged into an electric furnace.

Patent Document 3 discloses a method in which, in order to melt and reform steelmaking slag having low fluidity at a low temperature, the surface of the slag is mechanically stirred before or after adding or thermally spraying a reforming material to the steelmaking slag having low fluidity accommodated in a container, a mixed layer of the steelmaking slag and the reforming material is heated using a heating burner to melt the mixed layer, and the obtained molten slag is discharged from the container to be solidified.

Patent Document 4 describes that high-temperature molten slag having fluidity is temporarily held in a slag holding furnace, a molten slag layer is formed as a buffer zone on a molten iron layer in an electric furnace, and molten slag is poured from the slag holding furnace into the molten slag layer.

In the structure described in Patent Document 4, the electric furnace is used. Therefore, a reduction reaction between iron (FeO) and carbon (C) in the slag is more predominant than a reduction reaction between the slag and the molten iron.

Accordingly, Patent Document 4 is advantageous in that, even in a case where the C concentration in the molten iron is low at about 1.5 mass %, the slag can be reduced without carburization, and the working efficiency can be improved.

Further, in the structure described in Patent Document 4, instead of directly pouring molten slag into the electric furnace, molten slag is temporarily held in the slag holding furnace which is disposed adjacent to the electric furnace, the molten slag layer is formed as a buffer zone on the molten iron layer in the electric furnace, and the molten slag is slowly poured while adjusting the pouring amount. Therefore, the structure described in Patent Document 4 is advantageous in that slag foaming can be reduced during the pouring of the slag.

PRIOR ART DOCUMENT

Patent Document

[Patent Document 1] Japanese Unexamined Patent Application, First Publication No. S52-033897
[Patent Document 2] Published Japanese Translation No. 2003-520899 of the PCT International Publication
[Patent Document 3] Japanese Unexamined Patent Application, First Publication No. 2005-146357
[Patent Document 4] Japanese Patent No. 5522320

Non-Patent Document

[Non-Patent Document 1] Scandinavian Journal of Metallurgy 2003; 32: p. 7 to 14

DISCLOSURE OF THE INVENTION

Problems to be Solved by the Invention

In the slag treatment method described in Patent Document 1, since the reduction treatment is performed using a converter, the molten iron and steel and the slag are stirred.

Therefore, in a case where the carbon concentration in the molten iron and steel during the pouring of the slag is high, the slag comes into contact with the molten iron and steel such that slag foaming occurs.

In order to avoid slag foaming, it is necessary to pour the slag into the molten iron and steel having a low carbon concentration, and then in order to promote the reduction reaction, it is necessary to pour carbon into the steel bath to increase the carbon concentration in the molten iron and steel.

Therefore, it is necessary to perform the slag reduction treatment multiple times and to repeat the treatment of oxidizing and extracting Mn and P, and thus the working efficiency and the productivity may deteriorate.

In the slag reduction method described in Patent Document 2, the reduction treatment is also performed using a converter. Therefore, in order to increase or decrease the carbon concentration in molten iron and to reduce the iron and steel slag, treatments such as decarburization heating and carburization reduction are repeated, and thus the working efficiency and the productivity may decrease.

In the reduction test described in Non-Patent Document 1, a ground product of solidified cold steelmaking slag is used as a treatment target. In the method described in Patent Document 3, steelmaking slag having low fluidity at a low temperature is used as a treatment target.

In this case, in order to perform the reduction treatment of the slag, it is necessary to heat and melt the slag, and there is a problem in that the energy consumption rate is high.

Further, even in a case where the molten slag layer is formed as a buffer zone using the electric furnace including the slag holding furnace as described in Patent Document 4, the molten slag layer in the electric furnace is disturbed depending on the pouring amount or pouring rate of the molten slag, and the just-poured molten slag comes into contact with the molten iron layer positioned below the molten slag layer. As a result, slag foaming may occur.

In addition, in Patent Document 4, in a case where the slag pouring amount from the slag holding furnace is adjusted so as to prevent the molten slag layer from being disturbed, it is necessary to reduce the pouring rate and pouring amount of the slag. Therefore, there is a problem in that the treatment efficiency decreases.

In addition, the slag is poured by tilting the furnace body of the holding furnace. Therefore, depending on the size of the holding furnace, it is difficult to finely adjust the slag pouring rate.

Thus, even in a case where the pouring rate is set to be slow, the slag pouring rate varies such that the pouring rate temporarily increases and slag foaming may occur.

The present invention has been made in consideration of the above-described problems, and an object thereof is to provide an electric furnace in which the occurrence of large slag foaming caused when molten slag which is just poured from a slag holding furnace and a molten iron layer in the electric furnace are vigorously mixed with each other can be prevented.

Means for Solving the Problem

That is, the summary of the present invention is as follows.

(1) According to one aspect of the present invention, there is provided an electric furnace including: a furnace body that includes an electrode; and a slag holding furnace that is configured to hold molten slag in a molten state and is capable of pouring the molten slag into the furnace body when tilted, in which the furnace body includes a cylindrical furnace wall, a furnace cover that is provided at an upper end of the furnace wall, a furnace bottom that is provided at a lower end of the furnace wall and includes a deep bottom portion and a shallow bottom portion as a region having a height of 150 mm to 500 mm from a deepest point of the deep bottom portion, and a slag pouring port that is provided at the furnace cover and through which the molten slag is poured from the slag holding furnace, the slag pouring port overlaps the shallow bottom portion in a plan view, and the area ratio of the shallow bottom portion to the furnace bottom in a plan view is 5% to 40%.

(2) In the electric furnace according to (1), the furnace wall may further include a main body having an annular cross-sectional shape perpendicular to a height direction and a projected portion that is configured to project in a radial direction of the main body, the shallow bottom portion may be provided at a lower end of the projected portion, and the slag pouring port may be provided at an upper end of the projected portion.

(3) In the electric furnace according to (1), the furnace wall may have a main body having an annular cross-sectional shape perpendicular to a height direction, and the shallow bottom portion may be provided at a lower end of the main body.

(4) In the electric furnace according to any one of (1) to (3) may further include a reducing material feeding port that is provided at the furnace cover or at both the furnace cover and the furnace wall and through which a reducing material is added into the electric furnace.

Effects of the Invention

With the above-described electric furnace, molten slag which is just poured from the slag holding furnace can be prevented from coming into contact with the molten iron layer in the electric furnace. Therefore, vigorous mixing between just-poured molten slag and the molten iron layer can be prevented.

Therefore, the occurrence of large slag foaming caused by a rapid reaction between the molten slag layer and the molten iron layer can be prevented.

EMBODIMENTS OF THE INVENTION

Hereinafter, the details of a preferred embodiment of the present invention will be described with reference to the accompanying drawings.

1. Summary of Slag Treatment Process

First, the summary of a slag treatment process according to an embodiment of the present invention in which an electric furnace is used will be described with reference to FIG. 1.

Figure 1:
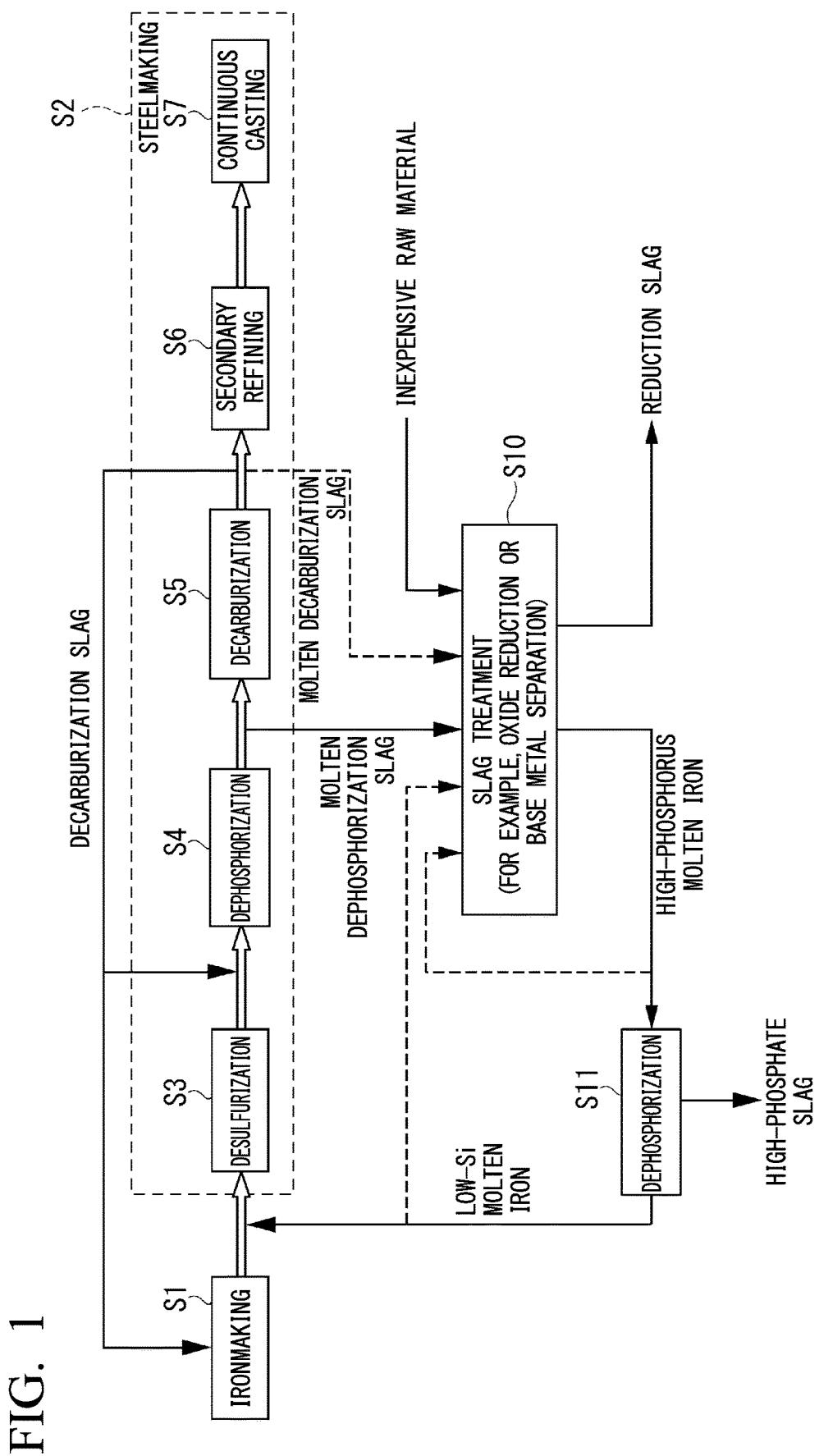
FIG. 1 is a flowchart showing a slag treatment process in which an electric furnace according to the present invention is used.

As shown in FIG. 1, molten iron is produced using a blast furnace in an ironmaking step (S1), and pig iron is refined into steel using a converter or the like in a steelmaking step (S2).

The steelmaking step (S2) includes: respective steps of desulfurization, dephosphorization, and decarburization of removing sulfur, phosphorus, carbon, and the like in the molten iron; a secondary refining step (S6) of removing gas such as hydrogen, sulfur, and the like remaining in the molten steel to adjust components; and a continuous casting step (S7) of casting the molten steel in a continuous casting machine.

In the steelmaking step (S2), the dephosphorization step (S4) and the decarburization step (S5) are mainly performed using a converter.

Molten iron is refined in a converter by using a flux containing calcium oxide as a major component.

At this time, oxides are produced by oxidizing C, Si, P, Mn, and the like in molten iron with oxygen which is blown into the converter. These oxides are bonded to calcium oxide to produce slag.

In addition, in the respective steps of desulfurization, dephosphorization, and decarburization step (S3, S4 S5), various kinds of slags (desulfurization slag, dephosphorization slag, and decarburization slag) are produced.

In the description of this specification, the slags produced in the steelmaking step will be collectively called "steelmaking slag".

The steelmaking slag is a concept including desulfurization slag, dephosphorization slag, and decarburization slag.

In addition, steelmaking slag which is in a molten state and has a high temperature will be referred to as "molten slag". Likewise, desulfurization slag, decarburization slag, and dephosphorization slag which are in a molten state will be referred to as "molten desulfurization slag", "molten dephosphorization slag", and "molten decarburization slag", respectively.

In the slag treatment step (S10), the molten slag produced in the steelmaking step (S2) is transported from the converter to an electric furnace while maintaining the molten state thereof, and is continuously reduced, melted, and reformed in the electric furnace. As a result, valuable materials such as Fe and P in the molten slag are collected into a molten iron layer as a layer positioned below a molten slag layer.

At this time, in the electric furnace, for example, a treatment of reducing oxides such as Fe and P in the molten slag, a treatment of separating iron powder (iron) from the slag, or a treatment of adjusting the basicity of the slag is performed.

As a result, high-phosphorus molten iron containing phosphorus and the like is separated and collected from the molten slag. In addition, the molten slag is reduced and reformed, and high-quality reducing slag corresponding to blast furnace slag is collected.

The amounts of FeO, $P_2O_5$, and the like in the reducing slag are lower than that before reduction. Therefore, the reduction slag can be effectively recycled as, for example, a cement raw material or a ceramic product.

In addition, by adjusting the components of the molten slag such that the basicity thereof is low, the expansibility is low. Therefore, the reduction slag can be used as a base course material or an aggregate.

Further, the dephosphorization treatment (S11) is performed on the collected high-phosphorus molten iron such that P in the molten iron is oxidized and moves into the molten slag. As a result, the high-phosphorus molten iron is separated into high-phosphate slag and molten iron.

The high-phosphate slag can be utilized as, for example, a phosphate fertilizer or a phosphate raw material.

In addition, the molten iron is recycled in the steelmaking step (S2) and is poured into the converter or the like.

Hereinafter, the summary of the slag treatment process will be described.

In this process, it is preferable that the molten dephosphorization slag among various molten slags produced in the steelmaking step (S2) is used as a treatment target.

The molten dephosphorization slag has a lower temperature than the molten decarburization slag and contains a large amount of iron powder and phosphoric acid.

Therefore, the molten dephosphorization slag is melted and reformed not in the oxidation treatment but in the reduction treatment. As a result, the collection efficiency of valuable elements (for example, Fe and P) in the process is improved.

Therefore, in the following description, an example in which the molten dephosphorization slag is mainly used as a molten slag to be treated will be described.

However, the molten slag according to the present invention is not limited to the molten dephosphorization slag, and any steelmaking slag such as molten desulfurization slag or molten decarburization slag produced in the steelmaking step can be used.

2. Configuration of Slag Treatment Facility

Next, an electric furnace 100 used in the slag treatment step (S10) of the slag treatment process will be described with reference to FIG. 2.

The electric furnace 100 is a furnace in which a molten iron layer 6 and a molten slag layer 5 are formed in S10.

Figure 2:
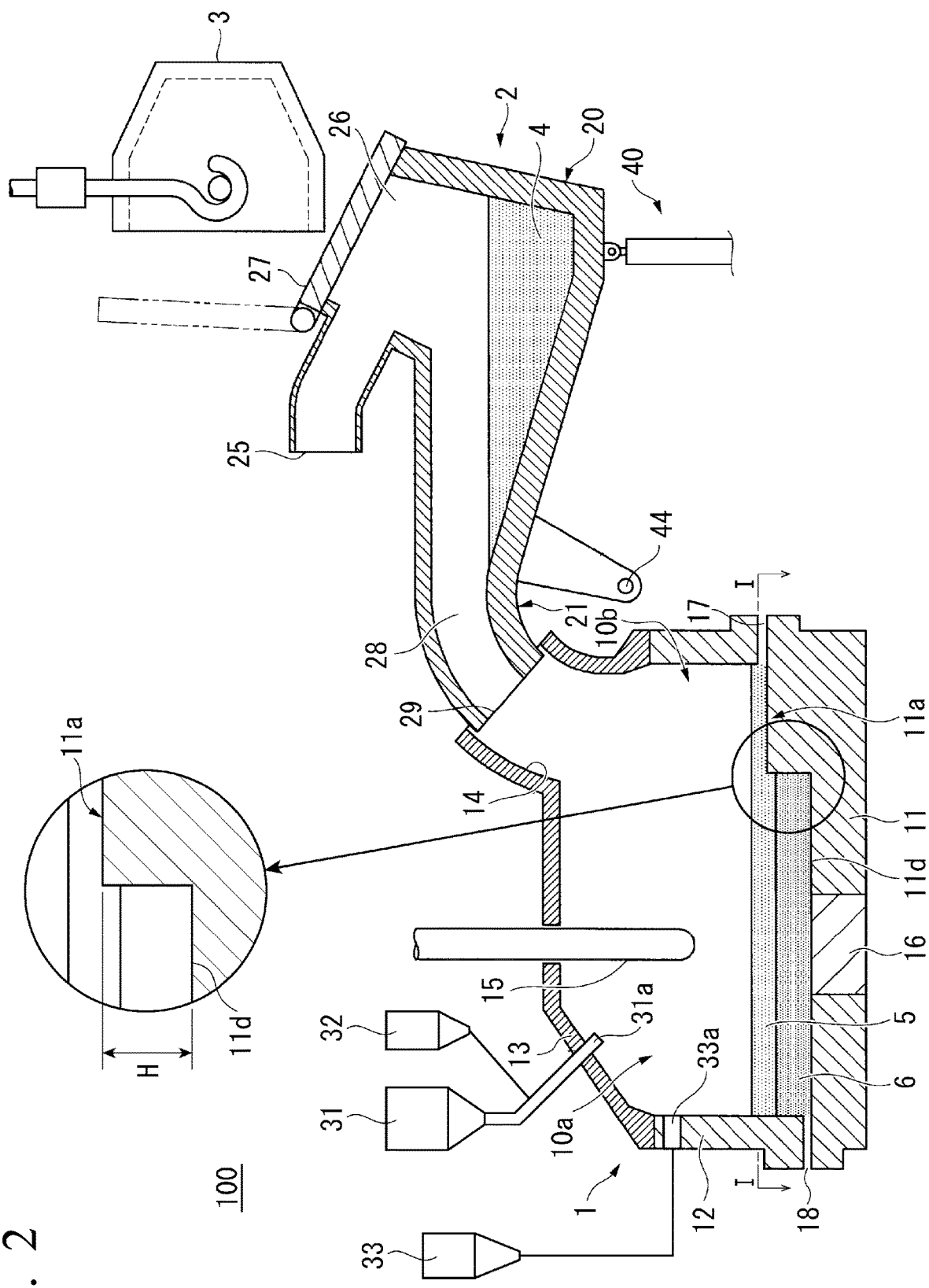
FIG. 2 is a vertical cross-sectional view showing a slag holding furnace (holding posture) and a furnace body according to an embodiment of the present invention.

As shown in an enlarged portion of FIG. 2, the electric furnace 100 includes: a furnace body 1; and a slag holding furnace 2 (slag holding container) that is disposed obliquely above the furnace body 1.

Means for pouring molten slag 4 into the slag holding furnace 2 is a slag ladle 3, and the slag ladle 3 reciprocates between a converter (not shown) and the slag holding furnace 2.

The molten slag 4 discharged from the converter is poured into the slag ladle 3.

The slag ladle 3 transports the molten slag 4 from the converter to the slag holding furnace 2 and pours the molten slag 4 into the slag holding furnace 2.

The slag holding furnace 2 can store and hold the molten slag 4 in the molten state, and can continuously or intermittently pour the held molten slag 4 into the furnace body 1 when tilted.

It is not necessary that the molten slag 4 held in the slag holding furnace 2 is in a completely molten state.

A part of the molten slag 4 may be solidified as long as the molten slag 4 as a whole has sufficient fluidity for being poured into the furnace body 1.

The furnace body 1 is a reduction type electric furnace that melts, reduces, and reforms the molten slag 4 using auxiliary materials, for example, a reducing material such as a carbon material and a reforming material. For example, the furnace body 1 is a stationary type direct current electric furnace not having a furnace tilting mechanism.

Hereinafter, an example of the stationary type direct current electric furnace will be described.

3. Configuration of Furnace Body 1

Next, a configuration of the furnace body 1 will be described with reference to FIGS. 2, 3, 4A, and 4B.

As shown in FIGS. 2, 3, 4A, and 4B, the furnace body 1 includes: a furnace wall 12; a furnace cover 13 that is provided at an upper end of the furnace wall 12; and a furnace bottom 11 that is provided at a lower end of the furnace wall 12.

An inner surface of each of the furnace bottom 11, the furnace wall 12, and the furnace cover 13 is lined with refractory.

On one side of the furnace cover 13, a slag pouring port 14 is formed.

The slag pouring port 14 is connected to the pouring hole portion 21 of the slag holding furnace 2.

The furnace body 1 is closed except the slag pouring port 14 such that the internal temperature of the furnace can be maintained.

At the center of the furnace body 1, an upper electrode 15 and a furnace bottom electrode 16 are disposed to vertically face each other.

A direct current power supply is applied to the upper electrode 15 and the furnace bottom electrode 16 to generate arc discharge between the upper electrode 15 and the furnace bottom electrode 16. As a result, energy required for reducing the molten slag 4 is supplied.

A reducing material feeding port 31a can be provided at the furnace cover 13.

The reducing material feeding port 31a is connected to raw material supply devices 31 and 32.

A reducing material feeding port 33a can be provided at the furnace wall 12.

A raw material supply device 33 is provided at the reducing material feeding port 33a.

The reducing material feeding ports 31a and 33a are portions through which auxiliary materials such as a reducing material and a reforming material required for the reduction treatment of the molten slag 4 are supplied.

FIG. 2 shows the structure where the reducing material feeding port is provided at both the furnace wall 12 and the furnace cover 13. However, the reducing material feeding port may be provided only at the furnace cover 13.

As the reducing material, for example, a fine powdered carbon material such as coke breeze, anthracite culm, or graphite powder is used.

The reforming material mainly adjusts the $SiO_2$ or $Al_2O_3$ concentration in the slag and silica sand, fly ash, or waste refractory powder is used therefor.

The reducing material may be means for reducing the occurrence of slag foaming.

The furnace bottom 11 includes a deep bottom portion 11d and a shallow bottom portion 11a having a shallower bottom than the deep bottom portion 11d.

The shallow bottom portion 11a is provided assuming that the furnace bottom 11 includes a portion exposed from the surface of the molten iron layer 6 during the slag treatment step.

During the slag treatment, not only molten slag 4 but also molten iron or molten steel may be charged into the electric furnace 100, and molten iron may be produced along with the slag reduction. Therefore, the height of the molten iron layer 6 increases.

Once the molten iron layer becomes thicker to some extent or more, a tap hole 18 that discharges molten iron is opened to reduce the height of the molten iron layer 6. Therefore, it is assumed that, after the height of the molten iron layer 6 is reduced, the shallow bottom portion 11a is exposed from the molten iron layer 6 such that the molten slag 4 for the next reduction treatment is poured into the electric furnace 100 in the above state.

Even in a case where the shallow bottom portion 11a is not exposed from the molten iron layer 6, the molten slag 4 can be poured into the furnace body 1. As long as the height of the molten iron layer 6 is low to some extent on the shallow bottom portion 11a, vigorous mixing between the poured molten slag 4 and the molten iron layer 6 can be reduced, and thus the object of the present invention can be achieved.

Figure 4A:
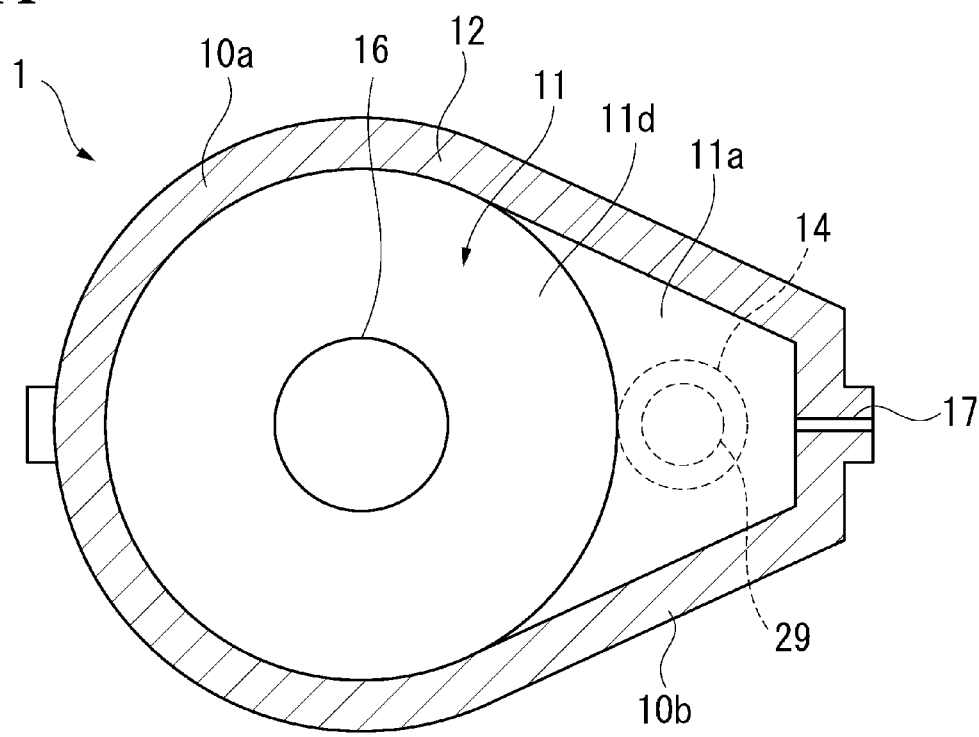
FIG. 4A is a cross-sectional view taken along line I-I of the furnace body shown in FIGS. 2 and 3.
Figure 4B:
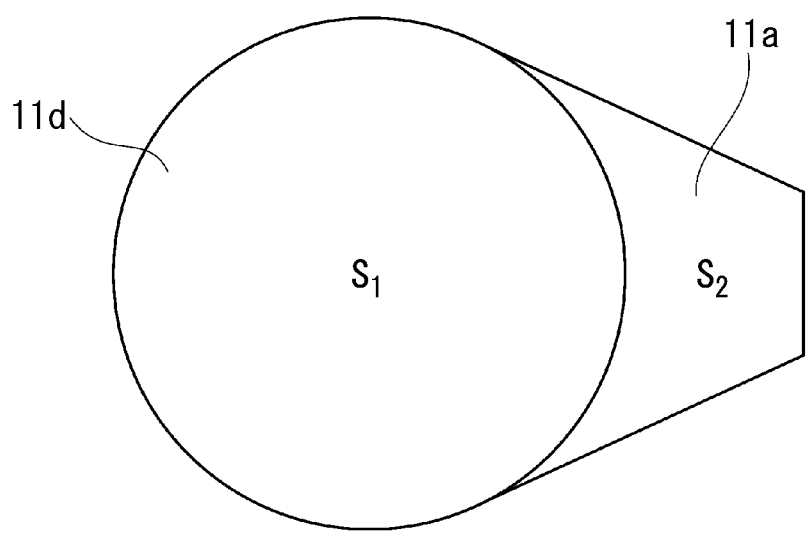
FIG. 4B is a cross-sectional view showing the furnace body at a height of 150 mm from a furnace bottom, in which only a shallow bottom portion and a deep bottom portion are shown.
Figure 6:
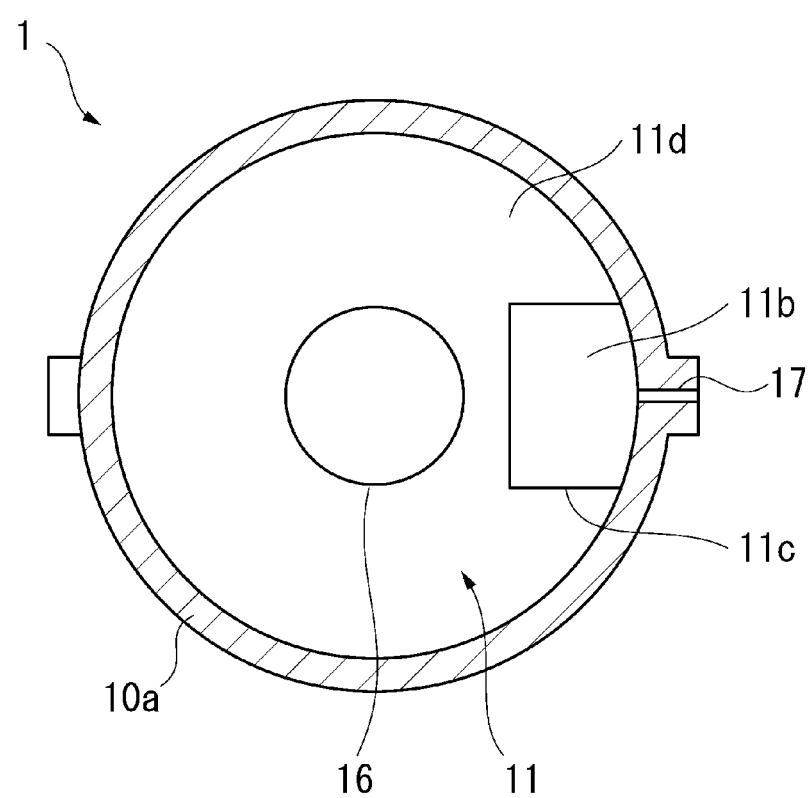
FIG. 6 is a cross-sectional view taken along line II-II of the electric furnace shown in FIG. 5.

As a structure of the furnace body 1, a structure (first embodiment) where a projected portion 10b is provided as shown in FIGS. 4A and 4B or a structure (second embodiment) where the projected portion 10b is not provided as shown in FIG. 6 can be adopted.

Here, first, the first embodiment will be described as an example.

In the first embodiment, a case of the furnace body 1 shown in cross-sectional views of FIGS. 4A and 4B will be described, the furnace body 1 including: a main body portion 10a having an annular cross-sectional shape perpendicular to a height direction; and the projected portion 10b that projects radially outward from the main body portion 10a.

Figure 3:
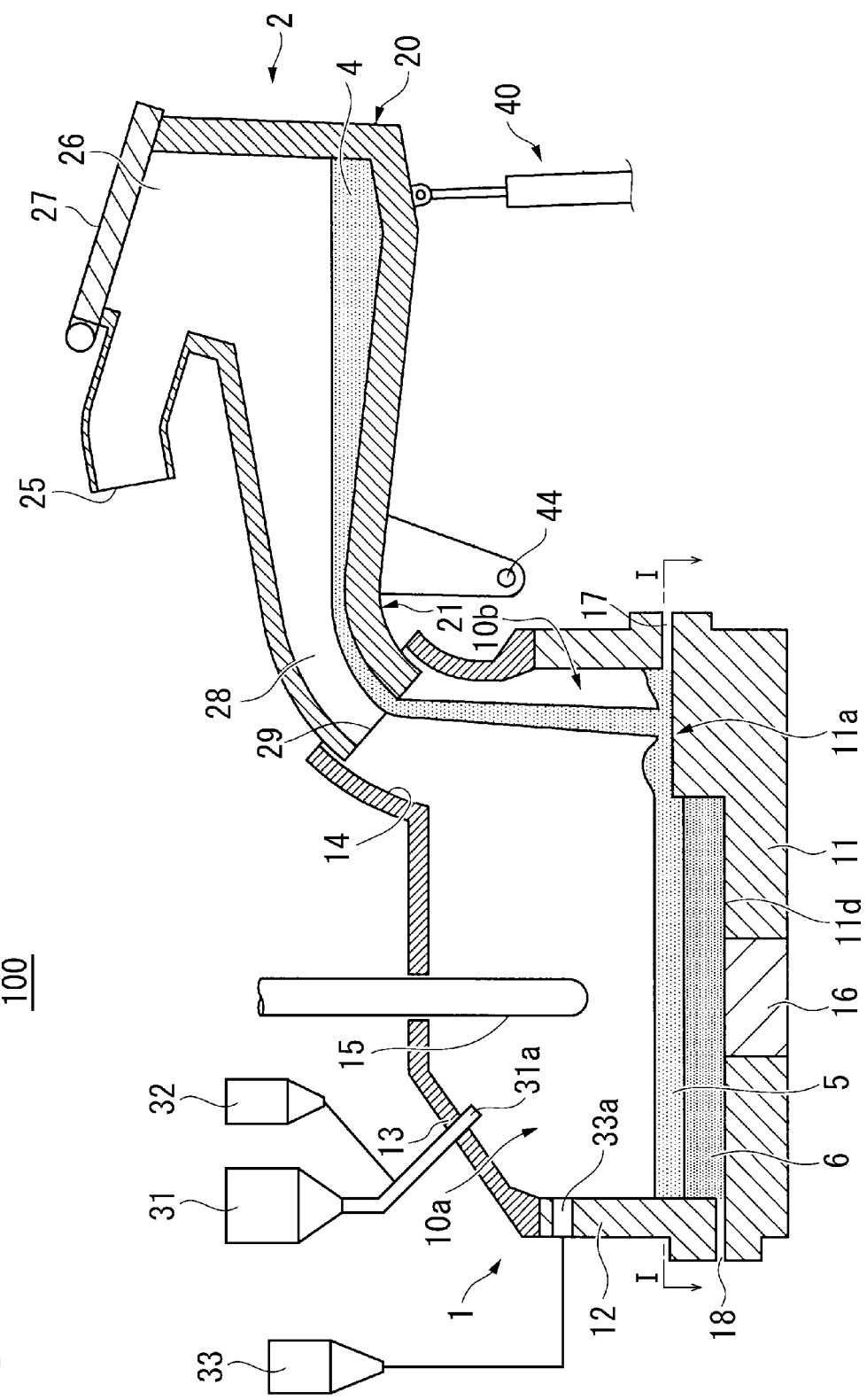
FIG. 3 is a vertical cross-sectional view showing the slag holding furnace (pouring posture) and the furnace body according to the embodiment.

The shallow bottom portion 11a is a portion that is raised assuming that the shallow bottom portion 11a is provided above the thickness of the molten iron layer 6 as a part of the furnace bottom 11 during the slag treatment step. For example, the shallow bottom portion 11a is formed by forming the furnace bottom 11 to become shallow stepwise in the projected portion 10b as shown in FIGS. 2 and 3.

The shallow bottom portion 11a is formed of refractory as in the case of the inner surfaces of the other portions of the furnace bottom 11.

As shown in FIG. 4A, the shallow bottom portion 11a overlaps the slag pouring port 14 in a plan view.

In other words, in a plan view, a region where the shallow bottom portion 11a is present and a region where the slag pouring port 14 is present partially or wholly overlap each other.

The molten slag 4 poured from the slag holding furnace 2 into the furnace flows through a pouring hole 29.

Since the pouring hole 29 is provided in a region of the slag pouring port 14, the molten slag flowing from the pouring hole falls down toward the shallow bottom portion 11a.

That is, the shallow bottom portion 11a includes a position where the molten slag 4 flows and falls down from the slag pouring port 14.

As a result, in a case where the molten slag 4 is poured into the furnace body 1, the molten slag 4 is poured toward the shallow bottom portion 11a.

In the projected portion 10b, the slag pouring port 14 is formed at the furnace cover 13.

In FIG. 2, the shallow bottom portion 11a is formed by forming the furnace bottom 11 to become shallow in one step in the projected portion 10b. However, the shallow bottom portion 11a is not limited to this step.

For example, the shallow bottom portion 11a may be formed by forming the furnace bottom 11 to become shallow in two or more steps. Alternatively, the shallow bottom portion 11a may be formed by forming a continuous slope instead of forming the furnace bottom 11 stepwise in the projected portion 10b.

In addition, the shallow bottom portion 11a does not necessarily have a horizontal surface as shown in FIG. 2.

The entire area of the shallow bottom portion 11a may have a stepwise shape or a slope shape as long as it can be assumed that the shallow bottom portion 11a positioned below the slag pouring port 14 is exposed from the molten iron layer 6 during the slag treatment step.

It is preferable that the shallow bottom portion 11a has a horizontal surface from the viewpoint that the area ratio of the shallow bottom portion 11a to the furnace bottom 11 in a plan view can be secured to be 5% or higher without reducing the inner volume of the furnace more than necessary.

As shown in FIG. 3, on a basic assumption, in a case where the slag holding furnace 2 is tilted toward the pouring hole portion 21 side such that the molten slag 4 is poured into the furnace body 1, the molten slag 4 poured from the slag pouring port 14 falls down toward the molten slag layer 5.

The molten slag layer 5 is disturbed by the falling molten slag 4. However, the shallow bottom portion 11a is present at the position where the molten slag 4 falls.

At the position where the shallow bottom portion 11a is present, the molten iron layer 6 is not present below the molten slag layer 5, and thus the just-poured molten slag 4 does not come into contact with the molten iron layer 6.

Accordingly, slag foaming caused by a rapid reaction between the just-poured molten slag 4 and the molten iron layer 6 can be prevented.

As shown in FIG. 2, the shallow bottom portion 11a is a region having a height H of 150 mm to 500 mm from the deepest point of the deep bottom portion 11d.

The reason is for this is that, in a case where the height is 150 mm or more, an effect of alleviating vigorous mixing between the molten slag 4 that is newly poured and the molten iron layer 6 that is originally present can be expected.

In addition, the reason why the height from the deepest point of the deep bottom portion 11d is 500 mm or less is that it is not necessary to set the height to be more than 500 mm, and in a case where the height is more than 500 mm, there is an adverse effect in that the inner volume of the furnace decreases.

As shown in FIG. 4B, in a case where the area of the deep bottom portion 11d in a plan view is represented by $S_1$ and the area of the shallow bottom portion 11a in a plan view is represented by $S_2$, the area ratio of the shallow bottom portion 11a to the furnace bottom 11 in a plan view ($S_2/(S_1+S_2) \times 100$) is preferably 5% to 40%.

By adjusting the area ratio to be 5% or higher, the proportion of the molten slag layer 5 that can exhibit the mixing alleviation effect can be secured such that the occurrence of vigorous foaming in the entire slag can be reduced.

In a case where the area ratio is higher than 40%, the effect of reducing the occurrence of foaming is not likely to be improved, whereas the amount of molten iron stored as the molten iron layer 6 or the area of an interface between the molten iron layer 6 and the molten slag layer 5 is reduced. Therefore, the reduction efficiency may decrease.

In addition, in a case where the area ratio is higher than 40%, the shallow bottom portion 11a is included in a high current density region of the furnace bottom 11. Therefore, the shallow bottom portion 11a is likely to be consumed.

In the present invention, the shallow bottom portion 11a is defined as "region having a height H of 150 mm to 500 mm from the deepest point of the deep bottom portion 11d". Therefore, the boundary between $S_1$ and $S_2$ is a position where the height H from the deepest point of the deep bottom portion 11d is 150 mm.

In addition, in FIG. 2, the shallow bottom portion 11a is exposed from the molten iron layer 6 and is immersed in the molten slag layer 5. However, the shallow bottom portion 11a may be exposed from the molten slag layer 5.

In this case, the molten slag 4 poured from the slag pouring port 14 collides against the surface of the shallow bottom portion 11a and subsequently flows down from the surface of the shallow bottom portion 11a toward the molten slag layer 5.

Since the molten slag 4 collides against the surface of the shallow bottom portion 11a, the kinetic energy is canceled out. Therefore, the molten slag 4 is not vigorously mixed into the molten iron layer 6.

Accordingly, a vigorous reaction between the molten slag 4 and the molten iron is also reduced, and slag foaming is reduced.

In addition, as shown in FIG. 2, a slag hole 17 for discharging reducing slag and a tap hole 18 for discharging molten iron can be provided at the furnace wall 12.

The slag hole 17 is formed at a position corresponding to the molten slag layer 5, specifically, at a position higher than an upper surface of the shallow bottom portion 11a.

The tap hole 18 is formed at a position corresponding to the molten iron layer 6, specifically, at a position lower than the upper surface of the shallow bottom portion 11a.

4. Configuration of Slag Holding Furnace

Next, a configuration of the slag holding furnace 2 used in the slag treatment process according to the embodiment will be described in detail with reference to FIGS. 2 and 3.

As shown in FIG. 2, the slag holding furnace 2 is a heat-resistant container that holds the molten slag 4 and pours the molten slag 4 into the furnace body 1.

The slag holding furnace 2 can adjust the pouring amount of the molten slag 4 into the furnace body 1 and also functions as an exhaust path of exhaust gas generated in the furnace body 1.

The slag holding furnace 2 includes: a furnace main body 20 that stores and holds the molten slag 4; and the pouring hole portion 21 for pouring the molten slag 4 from the inside of the furnace main body 20 into the furnace body 1.

The furnace main body 20 is a closed container and has an internal space for storing the molten slag 4.

A gas discharge port 25 and a slag pouring port 26 are formed at the furnace main body 20.

The gas discharge port 25 is an exhaust port from which exhaust gas of the furnace body 1 is exhausted through the slag holding furnace 2, and is connected to an air intake device such as a dust collector (not shown).

The internal atmosphere of the slag holding furnace 2 is maintained at a negative pressure by the air intake device.

The slag pouring port 26 is an opening for pouring the molten slag 4 into the furnace main body 20 from the slag ladle 3 provided above the slag pouring port 26.

An openable holding furnace cover 27 is provided at the slag pouring port 26, and the holding furnace cover 27 is opened during the pouring of the molten slag 4.

When the molten slag 4 is not poured, the holding furnace cover 27 is closed to close the slag pouring port 26. Therefore, the entrance of external air into the furnace main body 20 can be prevented, and the internal temperature of the furnace main body 20 can be maintained.

The pouring hole portion 21 is a cylindrical portion provided in the furnace main body 20 on the furnace body 1 side.

The internal space of the pouring hole portion 21 forms a slag pouring path 28 for pouring the molten slag 4 from the furnace main body 20 into the furnace body 1, and an opening formed at a tip portion of the pouring hole portion 21 is the pouring hole 29.

The slag pouring path 28 is narrower than the internal space of the furnace main body 20 in both a vertical direction and a furnace width direction (direction perpendicular to the plane of FIG. 2) and is downwardly curved toward the front side in the pouring direction.

The internal space of the furnace main body 20 gradually becomes narrower toward the pouring hole portion 21 side.

By forming the furnace main body 20 and the pouring hole portion 21 in this shape, the pouring amount can be easily adjusted during the pouring of the molten slag 4 from the furnace main body 20 into the furnace body 1.

The pouring hole portion 21 of the slag holding furnace 2 is connected to the slag pouring port 14 of the furnace cover 13 of the furnace body 1.

FIG. 2 shows a structure in which the inner diameter of the slag pouring port 14 of the furnace body 1 is set to be larger than the outer diameter of the pouring hole portion 21 such that the tip portion of the pouring hole portion 21 is inserted into the slag pouring port 14, and a small gap is present between the pouring hole portion 21 and the slag pouring port 14.

The structure that connects the pouring hole portion 21 and the slag pouring port 14 to each other is not limited to the structure of FIG. 2 and can be modified in various ways. For example, the pouring hole portion 21 and the slag pouring port 14 may be airtightly connected to each other, or a gap therebetween may be filled with a filler to connect the pouring hole portion 21 and the slag pouring port 14 to each other.

In a case where the internal atmosphere of the slag holding furnace 2 is set to be in a negative pressure state by activating the dust collector (not shown) in a state where the holding furnace cover 27 is closed, the slag holding furnace 2 functions as the exhaust path of the exhaust gas produced in the furnace body 1.

Specifically, the exhaust gas containing CO, $H_2$, and the like produced due to the reduction treatment in the furnace body 1 flows into the furnace main body 20 of the slag holding furnace 2 through the slag pouring port 14 of the furnace body 1 and the pouring hole portion 21 of the slag holding furnace 2.

The internal pressure of the slag holding furnace 2 is maintained to be negative. Therefore, even in a case where external air is introduced through the gap of the connection portion between the furnace body 1 and the slag holding furnace 2, the exhaust gas in the furnace body 1 does not leak to the outside through the gap.

The external air introduced through the gap is aspirated to the slag holding furnace 2 side.

Further, the exhaust gas flowing into the slag holding furnace 2 enters into the furnace main body 20, is exhausted from the gas discharge port 25, reaches the dust collector (not shown), and is treated.

In addition, a tilting device 40 is provided on the lower side of the furnace main body 20 of the slag holding furnace 2.

The tilting device 40 is a device that tilts the slag holding furnace 2 toward the pouring hole portion 21 side to pour the molten slag 4 in the furnace main body 20 into the furnace body 1 through the pouring hole portion 21.

The tilting device 40 can tilt the slag holding furnace 2 around a tilting shaft 44 between a holding posture (FIG. 2) and a pouring posture (FIG. 3).

As shown in FIG. 2, the holding posture is a posture in which the slag holding furnace 2 holds the molten slag 4 in the furnace main body 20 without pouring the molten slag 4 into the furnace body 1.

As shown in FIG. 3, the pouring posture is a posture in which the slag holding furnace 2 is tilted toward the pouring hole portion 21 side such that the molten slag 4 in the furnace main body 20 is poured into the furnace body 1.

When the posture of the slag holding furnace 2 is changed from the holding posture to the pouring posture, the slag holding furnace 2 is tilted around the tilting shaft 44 toward the furnace body 1 side.

As a result, as shown in FIG. 3, the position of the pouring hole portion 21 is lower than the furnace main body 20. Therefore, the molten slag 4 held in the furnace main body 20 flows toward the pouring hole portion 21 side and is poured from the pouring hole 29 into the furnace body 1 through the slag pouring path 28.

At this time, the pouring amount of the molten slag 4 can be adjusted by adjusting the tilting angle of the slag holding furnace 2.

In the electric furnace 100 according to the embodiment, the shallow bottom portion 11a is provided, and thus slag foaming can be effectively prevented.

Further, in the electric furnace 100 according to the embodiment, by tilting the slag holding furnace 2 using the tilting device 40, the molten slag 4 can be intermittently poured into the furnace body 1, or the pouring amount thereof can be adjusted.

In a case where the molten slag 4 is poured into the furnace body 1, it is preferable that the molten slag 4 is intermittently poured while appropriately adjusting the pouring amount (that is, the tilting angle of the slag holding furnace 2) using the tilting device 40 such that the poured molten slag 4 does not overflow from the furnace body 1 due to a rapid reaction with the molten iron in the furnace body 1.

When the pouring rate is fast during the pouring of the molten slag 4, the molten slag 4 in the furnace body 1 enters a foamed state, which may cause overflowing to occur.

In this case, it is preferable that the pouring of the molten slag 4 is temporarily stopped by reducing the tilting angle of the slag holding furnace 2 using the tilting device 40 or that the reaction in the furnace body 1 is reduced by reducing the pouring amount.

The pouring amount of the molten slag 4 per unit time using the slag holding furnace 2 is determined according to the reduction treatment capability of the furnace body 1.

The reduction treatment capability depends on the electricity supply per unit time to the furnace body 1, for example, the amount of power applied to the upper electrode 15 and the furnace bottom electrode 16 of the furnace body 1.

Therefore, the pouring amount of the molten slag 4 per unit time may be determined based on electric energy which is calculated based on an electric power consumption rate required for the reduction treatment of the molten slag 4 and an actual amount of power applied to the upper electrode 15 and the furnace bottom electrode 16.

Examples of a method of intermittently pouring the molten slag 4 from the slag holding furnace 2 into the furnace body 1 include a method of appropriately repeating the pouring of the molten slag 4 and the interruption thereof and a method of collectively pouring a predetermined amount of the molten slag 4 held in the slag holding furnace 2 at a predetermined time interval.

The molten slag 4 can also be continuously poured from the slag holding furnace 2 into the furnace body 1.

In a case where the molten slag 4 is intermittently poured, it is preferable that the fact that the total amount of the molten slag 4 poured at once is an amount in which overflowing caused by slag foaming does not occur is verified in advance by experiment or the like.

5. Reduction Treatment Method of Molten Slag

Next, the reduction treatment of the molten slag 4 in which the electric furnace 100 having the above-described configuration is used will be described with reference to FIGS. 2 and 3.

First, it is necessary to determine the area $S_1$ and H of the deep bottom portion 11d before the reduction treatment and to form the shallow bottom portion 11a based on the determined values.

Specifically, $S_1$ and H are determined such that the maximum volume of the molten iron layer 6 (the total volume of molten seed and reduced iron) is lower than $S_1 \times H$.

Next, as shown in FIG. 2, first, molten iron such as molten iron transported from a blast furnace is accommodated in advance in the furnace body 1 as molten seed and the molten iron layer 6.

The C concentration in the molten iron is typically 1.5 to 4.5 mass %.

Next, in a state where the furnace body 1 is continuously operated by supplying power thereto, the molten slag 4 is poured from the slag holding furnace 2 into the furnace body 1 in an amount corresponding to the reduction treatment capability of the furnace body 1 (for example, electricity supply per unit time to the furnace body 1) as shown in FIG. 3.

The molten slag 4 poured into the furnace body 1 forms the molten slag layer 5 on the molten iron layer 6.

The poured molten slag 4 falls down toward the shallow bottom portion 11a, and thus does not come into direct contact with the molten iron layer 6.

Accordingly, due to the presence of the shallow bottom portion 11a, slag foaming can be effectively prevented.

Further, the auxiliary materials such as the reducing material (carbon material) and the reforming material are also continuously added into the molten slag layer 5 in the furnace body 1, for example, through the raw material supply devices 31, 32, and 33.

In addition, in the furnace body 1, the temperature of the molten iron layer 6 is controlled to be, for example, 1400° C. to 1550° C., and the temperature of the molten slag layer 5 is controlled to be, for example, 1500° C. to 1650° C.

The temperature control can be realized by adjusting the supply rate of the molten slag 4 or by adjusting the electricity supply without changing the supply amount of the molten slag.

As a result, in the furnace body 1, the reduction reaction of the molten slag 4 in the molten slag layer 5 is promoted due to arc heat as an energy source generated between the upper electrode 15 and the furnace bottom electrode 16.

In this reduction treatment, oxides (for example, FeO and $P_2O_5$) contained in the molten slag 4 are reduced by C of the carbon material in the molten slag layer 5 to produce Fe and P. The produced Fe and P move from the molten slag layer 5 to the molten iron layer 6.

C in the residual carbon material is suspended in the molten slag layer 5 and is then melted in the molten iron.

In the reduction treatment, FeO contained in the poured molten slag 4 preferentially reacts with C of the carbon material in the molten slag layer 5 before C contained in the molten iron in the molten iron layer 6 (FeO+C→Fe+CO↑).

That is, C in the added carbon material is suspended in the molten slag layer 5 without moving to the molten iron layer 6. Therefore, in the molten slag layer 5, the reduction reaction of FeO+C→Fe+CO preferentially progresses, and the produced reduced iron (Fe) moves to the molten iron layer 6.

This way, in the reduction treatment using the furnace body 1, the reaction between FeO and C in the molten slag layer 5 is more predominant than the reaction FeO in the molten slag layer 5 and C in the molten iron layer 6.

Accordingly, in a case where the molten slag 4 is poured into the furnace body 1, the molten slag layer 5 on the molten iron layer 6 functions as a buffer zone for the reaction between the poured molten slag 4 and the molten iron of the molten iron layer 6. Therefore, a rapid reaction between the molten slag 4 and the molten iron can be reduced in cooperation with the effect obtained by providing the shallow bottom portion 11a.

That is, by pouring the molten slag 4 into the molten slag layer 5 having a low FeO concentration, the FeO concentration in the poured molten slag 4 can be reduced by dilution, and direct contact between the poured molten slag 4 and the molten iron of the molten iron layer 6 can be reduced.

Accordingly, in a case where the molten slag 4 is poured from the slag holding furnace 2 into the furnace body 1, slag foaming caused by a rapid reaction between the molten slag 4 and the molten iron can be reduced, and overflowing can be avoided.

As described above, oxides contained in the molten slag 4 which is poured into the molten slag layer 5 in the furnace body 1 are reduced such that Fe and P are collected from the molten slag 4 into the molten iron layer 6. Therefore, the amount of FeO and $P_2O_5$ in the molten slag 4 are reduced, and the slag components of the molten slag 4 are reformed.

Accordingly, when the reduction treatment progresses after the pouring of the molten slag 4, the components of the molten slag layer 5 are gradually reformed from the molten slag 4 (steelmaking slag) into the reducing slag (high-quality slag corresponding to blast furnace slag).

The molten slag layer 5 reformed into the reducing slag functions as a buffer zone having a lower FeO concentration. Therefore, in a case where the molten slag 4 is newly poured from the slag holding furnace 2 into the molten slag layer 5, slag foaming can be reliably reduced.

In addition, by adding a $SiO_2$ source or an $Al_2O_3$ source as the reforming material, the components of the molten slag can be adjusted.

In addition, depending on the pouring rate or pouring amount of the poured molten slag 4, the molten slag layer 5 may be disturbed by the molten slag 4. However, since the shallow bottom portion 11a is provided, the just-poured molten slag 4 does not come into contact with the molten iron layer 6.

Accordingly, slag foaming caused by a rapid reaction between the just-poured molten slag 4 and the molten iron layer 6 can also be prevented.

Even in a case where the contact between the poured slag flow and the molten iron layer 6 in the electric furnace 100 is prevented by the shallow bottom portion 11a of the furnace bottom 11, (T.Fe) in the molten slag layer 5 increases, the slag at the slag-metal interface reacts with C in the molten iron to produce CO gas, which may induce slag foaming.

Even in this case, by adding carbon powder from the reducing material feeding ports 31a and 33a, slag foaming can be reduced through defoaming and reduction of foamed slag.

In addition, when the reduction treatment progresses, Fe moves into the molten iron. Therefore, the thickness of the molten iron layer 6 gradually increases.

From the viewpoint of exhibiting the function as the buffer zone, the thickness of the molten slag layer 5 is preferably 100 to 600 mm and more preferably 100 to 800 mm.

In a case where the thickness of the molten slag layer 5 approaches the upper limit, the slag hole 17 is opened to discharge the reducing slag of the molten slag layer 5.

In addition, in a case where the interface of the molten iron layer 6 approaches the upper surface of the shallow bottom portion 11a, the tap hole 18 is opened to discharge the molten iron (for example, high-P molten iron) of the molten iron layer 6.

This way, the reducing slag is intermittently discharged and collected from the slag hole 17 of the furnace body 1, and the molten iron is intermittently discharged and collected from the tap hole 18.

As a result, in the furnace body 1, the reduction treatment of the molten slag 4 can be continued without interruption.

In addition, during the operation of the furnace body 1 (that is, during the reduction treatment), oxides of the molten slag 4 are reduced using C of the carbon material to produce high-temperature exhaust gas containing CO, $H_2$, and the like.

For example, in a case where iron oxide is reduced, CO gas is produced due to the reaction of $FeO+C \rightarrow Fe+CO\uparrow$.

This exhaust gas flows into the slag holding furnace 2 through the slag pouring port 14 of the furnace body 1 and is discharged to the outside through the inside of the slag holding furnace 2 as an exhaust path.

By using the closed furnace body 1 and using the slag holding furnace 2 as an exhaust path, the internal atmosphere of the furnace body 1 is maintained to be a reducing atmosphere containing, as major components, CO gas produced by the reduction reaction and $H_2$ produced from the carbon material (reducing material).

Accordingly, an oxidation reaction on the surface of the molten slag layer 5 can be prevented.

6. Second Embodiment

Next, the second embodiment of the present invention will be described with reference to FIGS. 5 and 6.

The second embodiment is different from the first embodiment in the shape of the furnace body 1, and the other functions and configurations are substantially the same as those of the first embodiment. Therefore, the detailed description will not be repeated.

Figure 5:
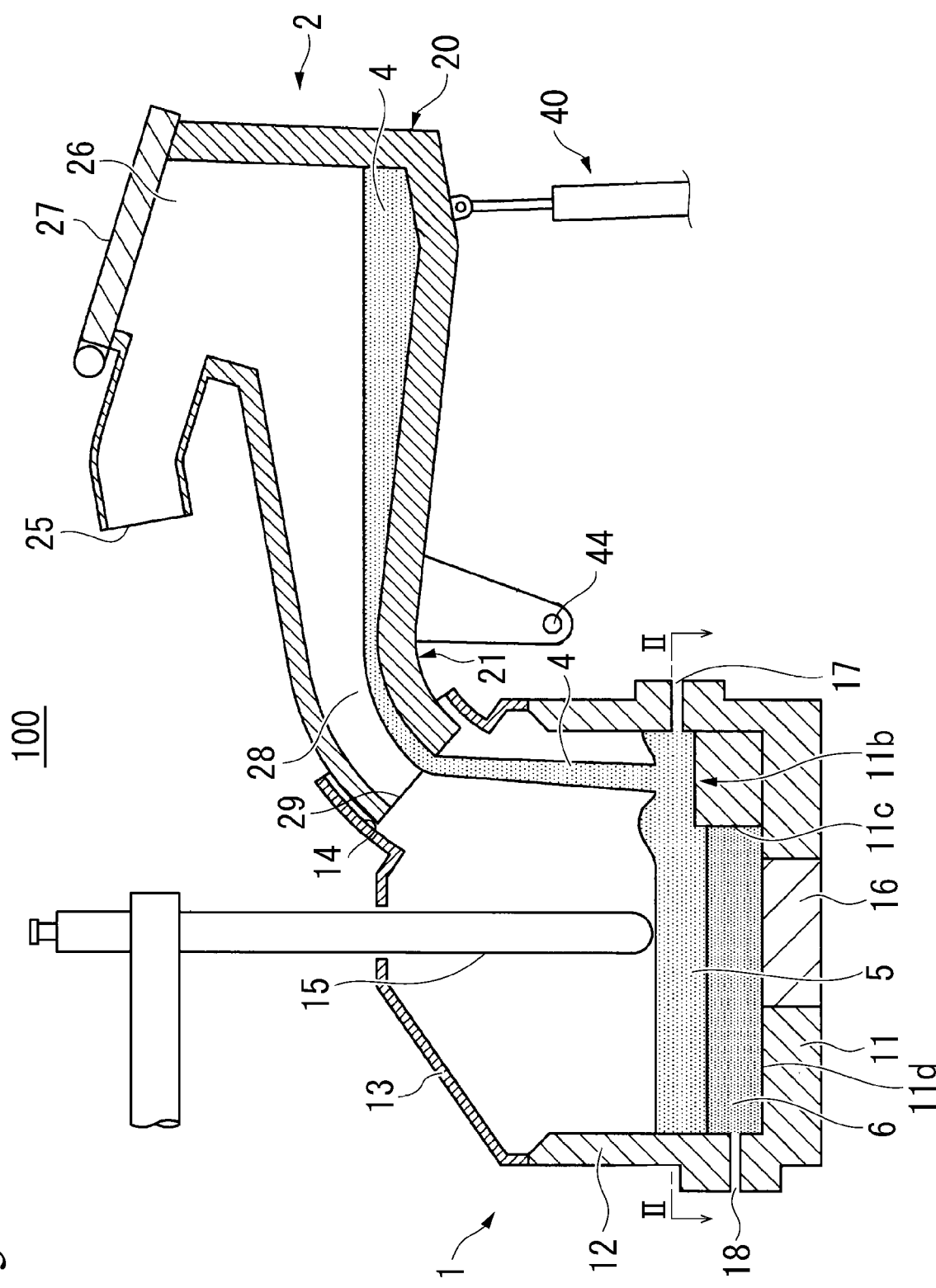
FIG. 5 is a vertical cross-sectional view showing a slag holding furnace (pouring posture) and an electric furnace according to a second embodiment of the present invention.

As shown in FIGS. 5 and 6, in the second embodiment, the furnace body 1 does not include the projected portion 10b.

The furnace body 1 includes the main body portion 10a having an annular cross-sectional shape.

A shallow bottom portion 11b is a portion obtained by partially raising a region of the furnace bottom 11 that overlaps the slag pouring port 14 of the main body portion 10a in a plan view.

The shallow bottom portion 11b is formed, for example, by a box-shaped step 11c that is disposed in contact with the inside of the furnace wall 12.

The surface of the step 11c is formed of refractory as in the case of the inner surfaces of the other portions of the furnace bottom 11.

The second embodiment is advantageous in that, even in a case where an existing electric furnace having a general furnace shape and not including the shallow bottom portion 11b is used, the shallow bottom portion 11b can be formed by attaching the step 11c thereto through a post process.

As shown in FIG. 5, in a case where the slag holding furnace 2 is tilted toward the pouring hole portion 21 side such that the molten slag 4 is poured into the furnace body 1, the molten slag 4 poured from the slag pouring port 14 falls down toward the molten slag layer 5 below the slag pouring port 14.

As in the first embodiment, in this portion, the molten iron layer 6 is not present below the molten slag layer 5 due to the shallow bottom portion 11b. Therefore, the occurrence of slag foaming caused by a rapid reaction and boiling between the just-poured molten slag 4 and the molten iron layer 6 can be prevented.

The second embodiment of the present invention described above is more advantageous than the first embodiment in that the shallow bottom portion 11b can be subsequently formed in an existing electric furnace through a post process.

On the other hand, in the first embodiment, the shallow bottom portion 11a can be made to be wider. Therefore, the distance between a portion where the molten slag layer 5 is likely to be disturbed by the poured molten slag 4 and a portion where the molten iron layer 6 is present below the molten slag layer 5 can be increased, and the effect of preventing slag foaming can be enhanced.

In addition, in the second embodiment, the position of the shallow bottom portion 11b is closer to the center of the furnace body 1 than that of the first embodiment.

At the center of the furnace body 1, large heat is generated due to arc discharge generated between the upper electrode 15 and the furnace bottom electrode 16. Therefore, erosion of the refractory forming the surface of the shallow bottom portion 11b is likely to be more than that of the other portions of the furnace bottom 11 or the shallow bottom portion 11a according to the first embodiment.

This way, the first embodiment and the second embodiment of the present invention have different advantageous effects, and thus can be appropriately selected and used according to, for example, operation conditions or the current status of facilities.

In addition, the present invention is not limited to these embodiments, and other embodiments obvious to those skilled in the art obtained from the descriptions of the embodiments can also be adopted.

EXAMPLES

Next, an example of the present invention will be described.

The following example is merely a condition example which is adopted to verify the operability and effects of the present invention, and the present invention is not limited to conditions of the following example.

(Simulation)

First, in order to verify the influence of the presence or absence of the shallow bottom portion 11a, a computer simulation simulating the electric furnace 100 shown in FIG. 2 was performed before a real operation.

Specific procedures are as follows.

First, using a universal fluid analysis software FLUENT, the molten slag 4 was poured into an electric furnace under the following conditions, and the behavior thereof was observed in an axial cross-sectional direction of the furnace.

Volume of Furnace: 13.8 $m^3$

Furnace Bottom Area ($S_1+S_2$): 7.5 $m^2$

Figure 7:
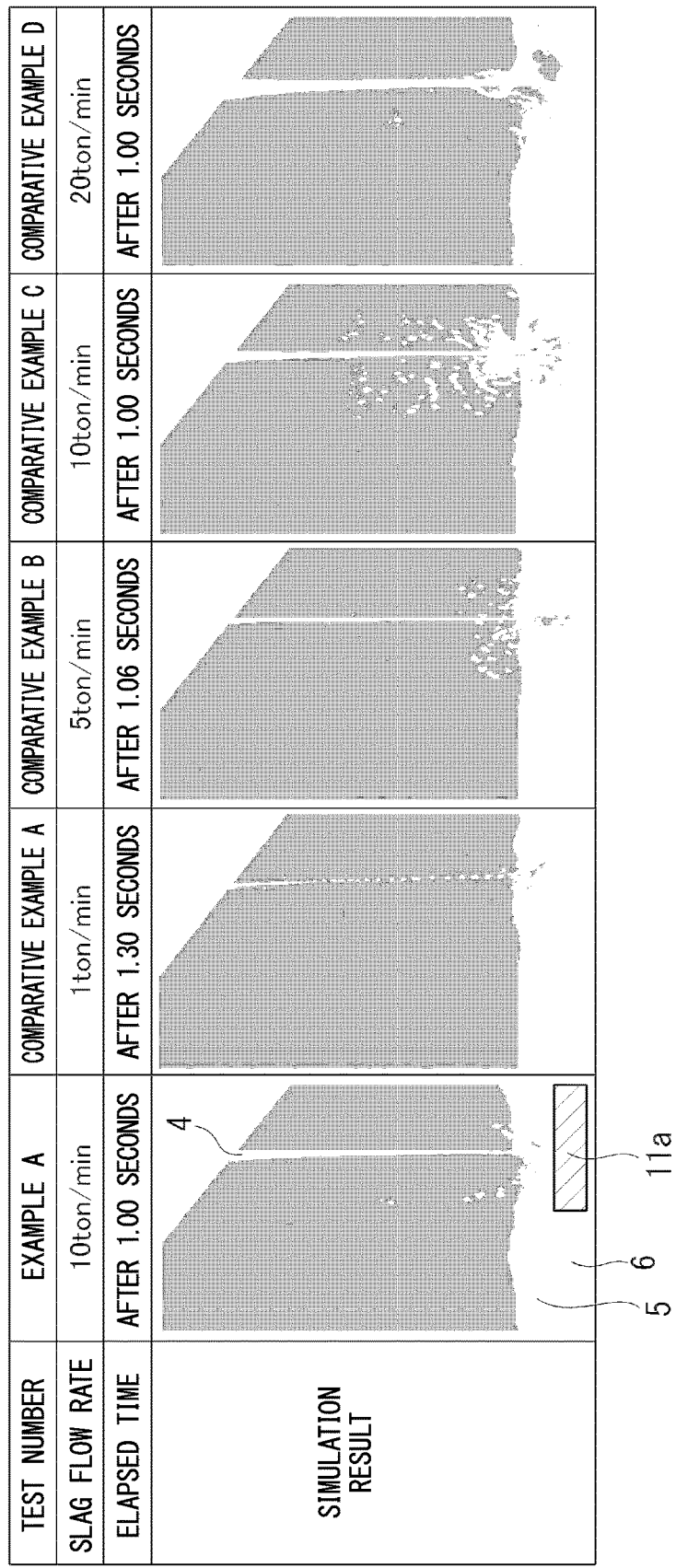
FIG. 7 is a diagram showing the result of a simulation of pouring slag into a furnace body.

Slag Viscosity in Furnace: 0.25 Pa·s
Poured Slag Viscosity: 1.0 Pa·s
Molten Iron Viscosity: 0.006 Pa·s
Height of Shallow Bottom Portion (H): 250 mm
Area of Shallow Bottom Portion ($S_2$): 1.1 m$^2$
Amount of Molten Seed: 1.4 m$^3$
Width of Poured Slag Flow: 500 mm
Slag Pouring Rate: 1 t/min, 5 t/min, 10 t/min, 20 t/min
The results are shown in FIG. 7.

In FIG. 7, Example A is an example in which the slag pouring rate was 10 t/min and the shallow bottom portion 11a was provided, Comparative Example A is an example in which the slag pouring rate was 1 t/min and the shallow bottom portion 11a was not provided, Example B is an example in which the slag pouring rate was 5 t/min and the shallow bottom portion 11a was not provided, Comparative Example C is an example in which the slag pouring rate was 10 t/min and the shallow bottom portion 11a was not provided, and Comparative Example D is an example in which the slag pouring rate was 20 t/min and the shallow bottom portion 11a was not provided.

As shown in FIG. 7, at the slag pouring rate of 1 t/min, even Comparative Example A in which the shallow bottom portion 11a was not provided, the poured molten slag 4 did not substantially reach the molten iron layer 6, and only a reaction between the poured molten slag 4 and the molten iron layer 6 was observed.

At the slag pouring rates of 1 t/min, 5 t/min, 10 t/min, and 20 t/min, in a case where the shallow bottom portion 11a was not provided, the poured molten slag 4 reached the molten iron layer 6, and a part of the molten slag 4 penetrated into the molten iron layer 6 and reacted with C in the molten iron.

In particular, it was found that, at 10 t/min and 20 t/min, the reaction was vigorous and the molten iron and the molten slag 4 were mixed with each other, and the mixture thereof was scattered.

On the other hand, in a case where the shallow bottom portion 11a is provided, even at the slag pouring rate of 10 t/min, the poured molten slag 4 did not substantially react with the molten iron layer 6. Accordingly, it is considered that the mixture of the molten iron and the molten slag 4 was not scattered.

It was found from the above result that, by providing the shallow bottom portion 11a, the poured molten slag 4 and the molten iron layer 6 can be prevented from being mixed with each other and reacting with each other.

(Slag Pouring Test: Comparative Example)

Next, using the electric furnace 100 shown in FIG. 2 having a structure in which the shallow bottom portion 11a was not provided, a slag pouring test was performed to measure the CO gas emission amount.

Specific procedures are as follows.

First, the molten iron layer 6 and the molten slag layer 5 were formed in advance in the furnace body 1.

Conditions of the furnace body 1 were the same as those of the simulation except that the shallow bottom portion 11a was not provided.

Next, in a state where the furnace body 1 was continuously operated by applying a power of 2.4 MW (240 V, 10 kA) thereto, 680 kg of the molten slag 4 was poured at once while adding carbon powder at 2.5 kg/min.

As a result, immediately after the pouring of the molten slag 4, CO gas was produced at a flow rate of 300 Nm$^3$/h, and subsequently the flow rate slowly decreased.

Next, the operation was continued without changing the feeding rate of the carbon powder. After about 20 minutes from the initial pouring of the molten slag 4, 540 kg of the molten slag 4 was poured at once.

As a result, immediately after the pouring of the molten slag 4, CO gas was produced at a flow rate of 400 Nm$^3$/h, and subsequently the flow rate slowly decreased.

Further, the operation was continued without changing the feeding rate of the carbon powder. After about 15 minutes from the initial pouring of the molten slag 4, 800 kg of the molten slag 4 was poured at once.

As a result, immediately after the pouring of the molten slag 4, CO gas was produced at a flow rate of 500 Nm$^3$/h, and subsequently the flow rate slowly decreased.

Next, the pouring amount of the carbon powder was increased to 3.5 kg/min. After about 25 minutes from the pouring of the molten slag 4, 20 kg of the molten slag 4 was poured at once.

As a result, immediately after the pouring of the molten slag 4, CO gas was produced at a flow rate of 250 Nm$^3$/h, and subsequently the flow rate slowly decreased.

Figure 8:
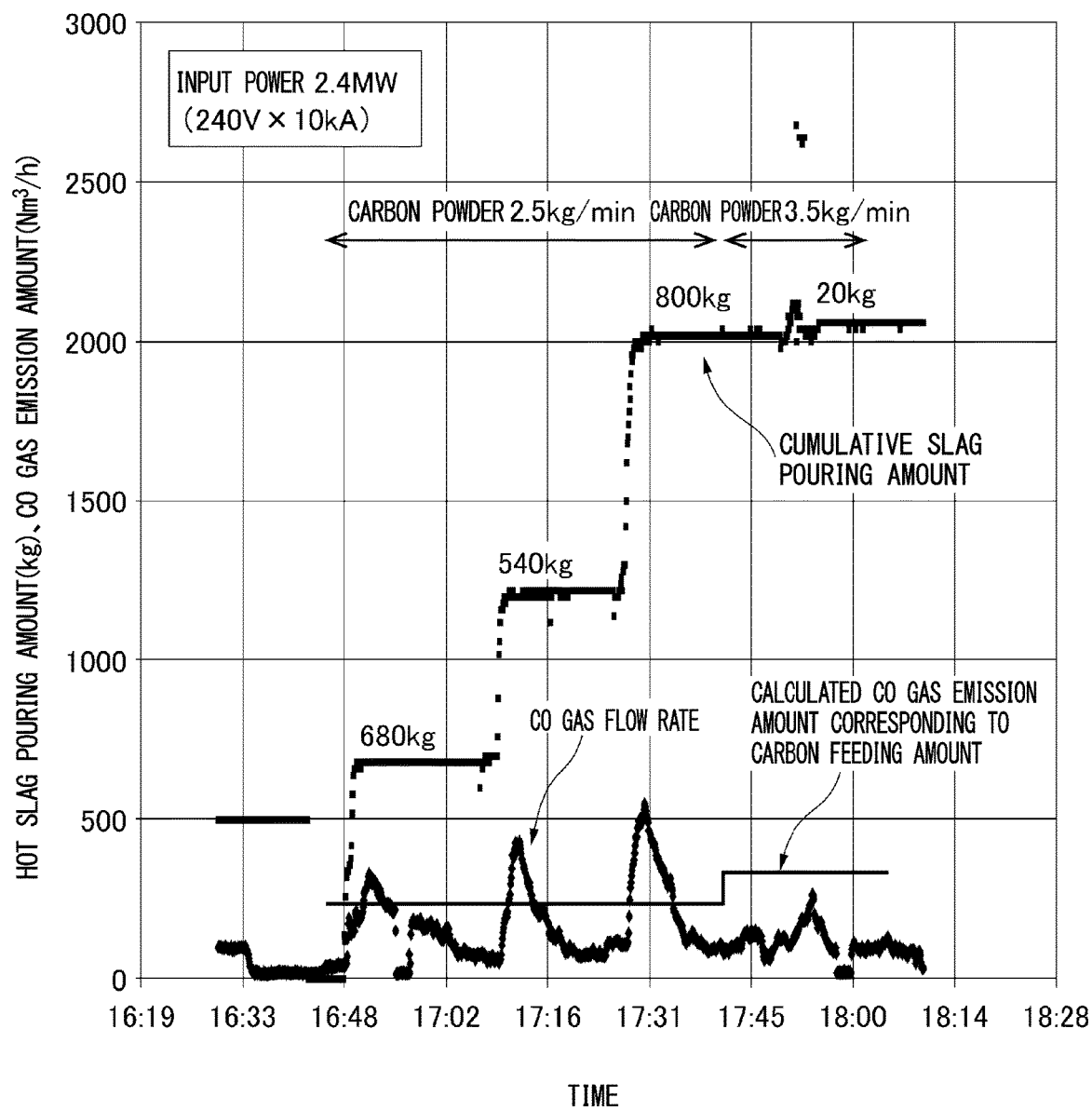
FIG. 8 is a diagram showing the slag pouring amount into the furnace body and the CO emission amount in a case where the shallow bottom portion is not provided.

The results are shown in FIG. 8.

As shown in FIG. 8, in the electric furnace 100 in which the shallow bottom portion 11a was not provided, CO gas was produced immediately after the pouring of the molten slag 4, which implies that slag foaming may occur.

(Slag Pouring Test: Example)

Next, using the electric furnace 100 shown in FIG. 2 having a structure in which the shallow bottom portion 11a was provided, a slag pouring test was performed to measure the CO gas emission amount.

Specific procedures are as follows.

Next, in a state where the furnace body 1 was continuously operated by applying a power of 2.4 MW (240 V, 10 kA) thereto, 780 kg of the molten slag 4 was poured at once without pouring the carbon powder.

The other conditions were the same as those of "Slag Pouring Test: Comparative Example".

As a result, immediately after the pouring of the molten slag 4, CO gas was not produced, and subsequently the CO gas emission amount was 100 Nm$^3$/h or lower in terms of flow rate.

Figure 9:
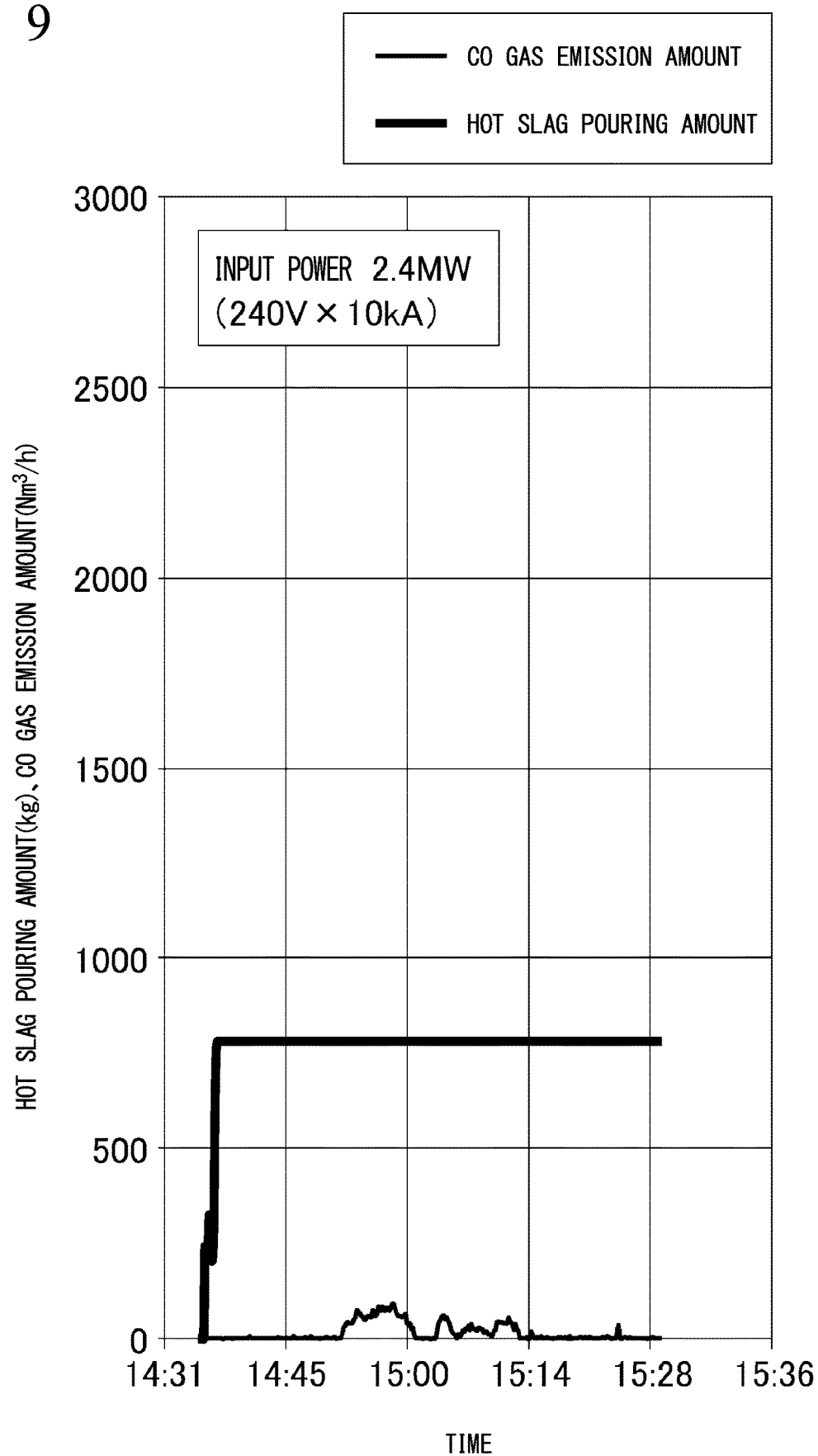
FIG. 9 is a diagram showing the slag pouring amount into the furnace body and the CO emission amount in a case where the shallow bottom portion is provided.

The results are shown in FIG. 9.

As shown in FIG. 9, in the electric furnace 100 in which the shallow bottom portion 11a was provided, CO gas was not produced immediately after the pouring of the molten slag 4, and it is presumed that the shallow bottom portion 11a reduced the occurrence of slag foaming.

(Real Operation Test)

Figure 10:
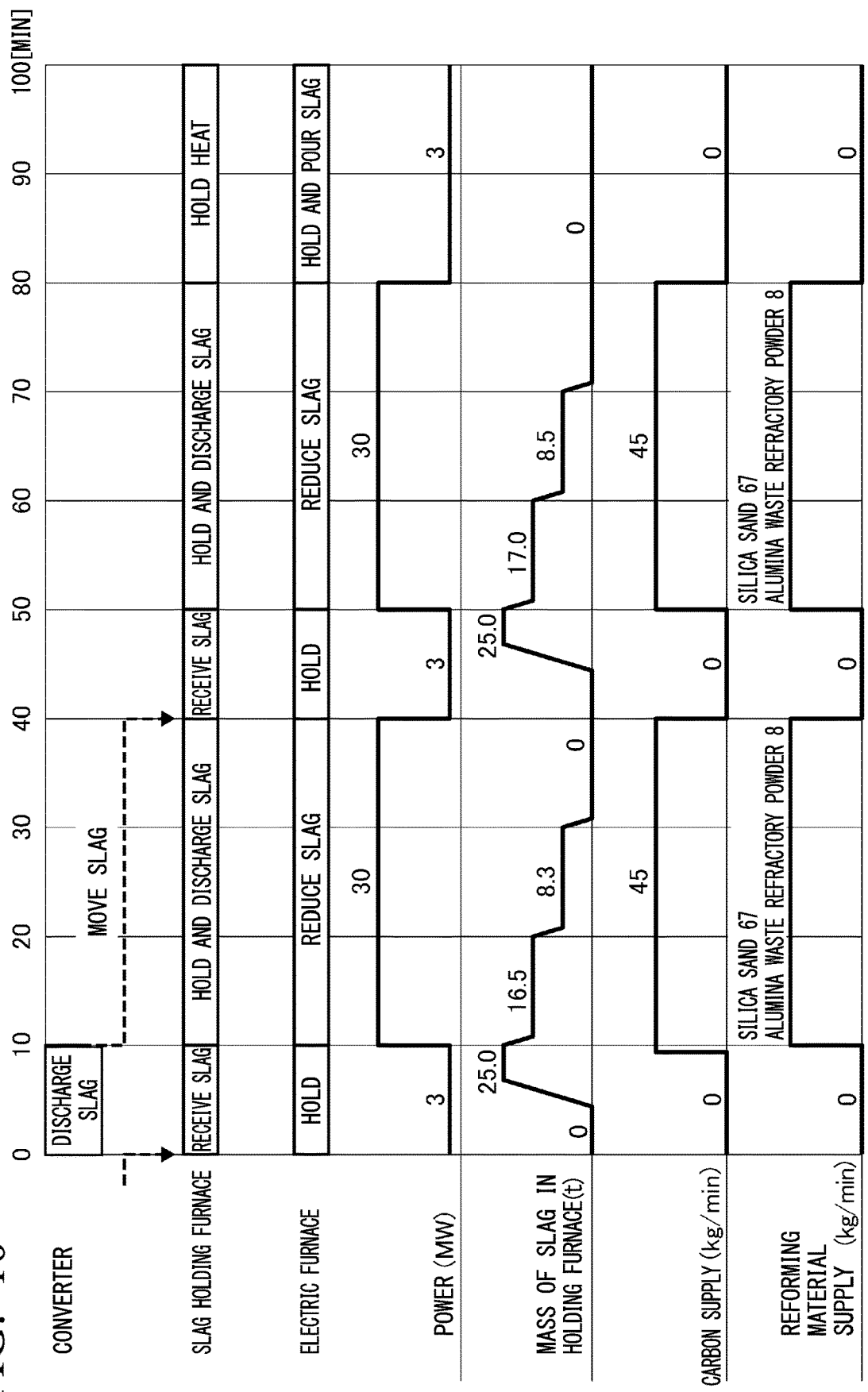
FIG. 10 is a diagram showing operation patterns in Examples according to the present invention and Comparative Examples.

Next, in a case where the shallow bottom portion was provided and in a case where the shallow bottom portion was not provided, the electric furnace was operated according to an operation pattern shown in FIG. 10 to check whether or not slag foaming occurred.

First, the electric furnace 100 having the following conditions were prepared.

Volume of Furnace: 13.8 m$^3$
Furnace Bottom Area ($S_1+S_2$): 7.5 m$^2$
Slag Composition: (T.Fe)=0.8%, (CaO)=33.1%, ($SiO_2$)=28.4%
Molten Iron Composition: [C]=2.8%, [Si]=0.18%, [P]=0.33%
Height of Shallow Bottom Portion (H): 250 mm
Area of Shallow Bottom Portion (S2): 1.1 m$^2$
Amount of Molten Seed: 1.3 m$^3$ Next, as shown in FIG. 10, first, about 25 t of the molten slag 4 per charge was poured from the slag ladle 3 into the slag holding furnace 2 once every 40 minutes and was temporarily held in the slag holding furnace 2.

Next, the slag holding furnace 2 was tilted from the holding posture to the pouring posture once every 10 minutes such that 8.0 t to 8.5 t of the molten slag 4 per time was intermittently poured into the molten slag layer 5 in the furnace body 1.

In addition, in the slag reduction treatment in the furnace body 1, while continuously supplying a power of 30 MW to the upper electrode 15 and the furnace bottom electrode 16, the carbon powder was supplied through the reducing material feeding ports 31a and 33a at a supply rate of 45 kg/min.

Further, as the reforming material, silica sand and alumina waste refractory powder were supplied through the reducing material feeding port 31a at respective supply rates of 67 kg/min and 8 kg/min.

The period of time from the end of the slag reduction treatment to the end of the pouring of the molten slag 4 of the next charge from the slag holding furnace 2 was (about 10 minutes), the supplied power was reduced, and the supply of the carbon material and the reforming material was stopped.

The operation patterns of Examples and Comparative Examples were the same except that the pouring cycles and the pouring amounts per time were different from each other.

The pouring cycles and the pouring amounts per time in Examples 1 and 4 and Comparative Example 1 were the same (pouring cycle: 5 minute, pouring amount per time: 4.0 t to 4.3 t), the pouring cycles and the pouring amounts per time in Example 2 and Comparative Example 2 were the same (pouring cycle: 10 minute, pouring amount per time: 8.0 t to 8.5 t), and the pouring cycles and the pouring amounts per time in Example 3 and Comparative Example 3 were the same (pouring cycle: 15 minute, pouring amount per time: 12 t to 13 t).

In addition, in each of Examples and Comparative Examples, the component composition of the molten slag 4 discharged from the converter to the slag ladle 3 is as shown in Table 1 below.

In each of the Comparative Examples 1 to 3, in the electric furnace where the shallow bottom portion 11a was not provided, the pouring cycle was long, and as the pouring amount per time increased, the foaming height increased. In Comparative Example 3 in which the pouring amount per time was large, the slag foaming height was 2500 mm or higher.

In addition, in each of Comparative Examples 1 to 3, CO gas was rapidly produced in the furnace body 1.

The reason for this is presumed that the just-poured molten slag 4 came into contact with the molten iron layer 6 positioned below the molten slag layer 5, FeO contained in the molten slag 4 rapidly reacted with C contained in the molten iron in the molten iron layer 6, and thus foaming occurred.

On the other hand, in Examples 1 and 2, the height of slag foaming significantly decreased, and the production of CO gas in the furnace body 1 was gentle as compared to Comparative Examples 1 and 2 under the same conditions.

In Example 3, the slag foaming height temporarily increased up to 600 mm. However, by blowing the carbon powder from a side wall 2 at 3 kg/min for 3 minutes, the slag foaming height was reduced up to 300 mm.

As a result, even in Example 3 in which the pouring cycle was the longest and the pouring amount per time was large, the slag foaming height was able to be reduced to 300 mm.

Accordingly, it can be said that, in the furnace body 1 according to the first embodiment of the present invention, by providing the shallow bottom portion 11a, the slag pouring amount per time can be increased to be larger than that of the related art while reducing the occurrence of slag foaming.

On the other hand, even in Example 4 in which the furnace body 1 according to the second embodiment was used, the height (160 mm) of slag foaming was slightly higher than that of Example 1 (90 mm) in which the furnace

TABLE 1

|  | (T.Fe) | (CaO) | (SiO$_2$) | (MnO) | (MgO) | (Al$_2$O$_3$) | (P$_2$O$_5$) | Others |
|---|---|---|---|---|---|---|---|---|
| Composition (mass %) | 19.8 | 33.3 | 23.5 | 6.1 | 8.2 | 1 | 1.5 | 6.6 |

In each of Examples and Comparative Examples, as indices indicating the influence on the reaction state in the furnace body 1 and exhaust gas treatment facility, the height of slag foaming occurred during the pouring of the molten slag 4 into the furnace body 1 and the production state of CO gas in the furnace body 1 (determination based on the flow rate of exhaust gas passing through the gas discharge port 25 and the CO+CO$_2$ concentration in the exhaust gas) were measured.

The summary of the results is shown in Table 2.

body 1 according to the first embodiment was used, but was significantly lower than Comparative Example 1 (1200 mm) under the same conditions.

As a result, the production of CO gas was gentle.

Accordingly, it was verified that, even in the furnace body 1 according to the second embodiment, by providing the shallow bottom portion 11b, the effect of reducing slag foaming can be sufficiently obtained.

The results of repeating the operations in Examples 1 to 4 are as follows. In Examples 1 to 3, while the refractory on

TABLE 2

|  | Example 1 | Example 2 | Example 3 | | Example 4 | Comparative Example 1 | Comparative Example 2 | Comparative Example 3 |
|---|---|---|---|---|---|---|---|---|
| Electric Furnace Type | First Embodiment | First Embodiment | First Embodiment | | Second Embodiment | No Shallow Bottom Portion | No Shallow Bottom Portion | No Shallow Bottom Portion |
| Pouring Cycle (min) | 5 | 10 | 15 | | 5 | 5 | 10 | 15 |
| Pouring Amount per Time (t) | 4.0 to 4.3 | 8.0 to 8.5 | 12 to 13 | | 4.0 to 4.3 | 4.0 to 4.3 | 8.0 to 8.5 | 12 to 13 |
| Carbon Powder Pouring | Not added | Not added | Not added | added | Not added | Not added | Not added | Not added |
| Foaming Height (mm) | 90 | 210 | 600 | 300 | 160 | 1200 | 2200 | 2500 or Higher |
| CO Gas Production State | Gentle | Gentle | Rapid | Gentle | Gentle | Rapid | Rapid | Rapid | the surface of the shallow bottom portion 11a was eroded by 50 mm, 700 to 1000 charges of operations were able to be performed. On the other hand, in Example 4, the refractory on the surface of the shallow bottom portion 11b was eroded by 50 mm in 200 to 300 charges of operations.

Accordingly, it was verified that the furnace body 1 according to the first embodiment is more advantageous in terms of the durability of the furnace bottom 11.

As described above, the furnace body 1 according to the second embodiment has other advantageous effects.

Hereinabove, the preferable embodiments of the present invention have been described in detail with reference to the accompanying drawings. However, the present invention is not limited to these embodiments.

It is apparent that those having ordinary skill in the technical field to which the present invention pertains can conceive various alternation examples or modification examples within a scope of technical ideas described in claims, and it would be understood that these examples belong to the technical scope of the invention.

INDUSTRIAL APPLICABILITY

According to the present invention, it is possible to provide an electric furnace in which the occurrence of large slag foaming caused when molten slag which is just poured from a slag holding furnace and a molten iron layer in the electric furnace are vigorously mixed with each other can be prevented.

BRIEF DESCRIPTION OF THE REFERENCE SYMBOLS

1: FURNACE BODY
2: SLAG HOLDING FURNACE
3: SLAG LADLE
4: MOLTEN SLAG
5: MOLTEN SLAG LAYER
6: MOLTEN IRON LAYER
10a: MAIN BODY PORTION
10b: PROJECTED PORTION
11: FURNACE BOTTOM
11a: SHALLOW BOTTOM PORTION
11b: SHALLOW BOTTOM PORTION
11c: STEP
11d: DEEP BOTTOM PORTION
12: FURNACE WALL
13: FURNACE COVER
14: SLAG POURING PORT
15: UPPER ELECTRODE
16: FURNACE BOTTOM ELECTRODE
17: SLAG HOLE
18: TAP HOLE
20: FURNACE MAIN BODY
21: POURING HOLE PORTION
25: GAS DISCHARGE PORT
26: SLAG POURING PORT
27: HOLDING FURNACE COVER
28: SLAG POURING PATH
29: POURING HOLE
31: RAW MATERIAL SUPPLY DEVICE
31a: REDUCING MATERIAL FEEDING PORT
33a: REDUCING MATERIAL FEEDING PORT
32: RAW MATERIAL SUPPLY DEVICE
33: RAW MATERIAL SUPPLY DEVICE
40: TILTING DEVICE
44: TILTING SHAFT
100: ELECTRIC FURNACE

What is claimed is:

1. An electric furnace comprising:
a furnace body that includes an upper electrode and a furnace bottom electrode vertically facing each other at the center of the furnace body; and
a slag holding furnace that is configured to hold molten slag in a molten state and is capable of pouring the molten slag into the furnace body when tilted,
wherein the furnace body includes
a furnace wall,
a main body portion having an annular cross-sectional shape perpendicular to a height direction,
a projected portion that is configured to project radially outward from the main body portion,
a shallow bottom portion provided at a lower end of the projected portion,
a furnace cover that is provided at an upper end of the furnace wall,
a furnace bottom that is provided at a lower end of the furnace wall and includes a deep bottom portion and the shallow bottom portion as a region having a height of 150 mm to 500 mm from a deepest point of the deep bottom portion,
a slag pouring port that is provided at the furnace cover and at an upper end of the projected portion, and through which the molten slag is poured from the slag holding furnace,
the slag pouring port overlapping the shallow bottom portion in a plan view,
an area ratio of the shallow bottom portion to the furnace bottom portion in a plan view is 5% to 40%,
a reducing material feeding port provided at the furnace cover above the deep bottom portion or the furnace wall above the deep bottom portion, and through which a reducing material is added into the electric furnace, and
a raw material supply device connecting to the reducing material feeding port.

* * * * *